United States Patent [19]
Suzuki et al.

[11] Patent Number: 5,170,860
[45] Date of Patent: Dec. 15, 1992

[54] DRIVING WHEEL CONTROL SYSTEM FOR AUTOMOTIVE VEHICLES

[75] Inventors: Norio Suzuki; Tetsuya Oono, both of Wako, Japan

[73] Assignee: Honda Giken Kogyo K.K., Tokyo, Japan

[21] Appl. No.: 672,475

[22] Filed: Mar. 20, 1991

[30] Foreign Application Priority Data

| Mar. 27, 1990 | [JP] | Japan | 2-31476[U] |
| Aug. 9, 1990 | [JP] | Japan | 2-84945[U] |
| Aug. 9, 1990 | [JP] | Japan | 2-84946[U] |

[51] Int. Cl.$^5$ .................................. B60K 28/16
[52] U.S. Cl. ................... 180/197; 123/399; 364/426.01
[58] Field of Search ......... 180/197; 364/426.01, 364/426.03; 123/361, 399

[56] References Cited

U.S. PATENT DOCUMENTS

| 4,581,924 | 4/1986 | Otobe et al. | 123/399 X |
| 4,856,477 | 8/1989 | Hanaoka et al. | 180/197 X |
| 4,941,444 | 7/1990 | Fujita | 123/399 |
| 5,033,431 | 7/1991 | Poirier et al. | 123/399 X |

FOREIGN PATENT DOCUMENTS

61-94597  5/1986  Japan .
62-81995  4/1987  Japan .

*Primary Examiner*—Charles A. Marmor
*Assistant Examiner*—Kevin Hurley
*Attorney, Agent, or Firm*—Arthur L. Lessler

[57] ABSTRACT

A control system for controlling driving wheels of an automotive vehicle in which when at least one of the driving wheels undergoes excessive slip, an ECU drives a pulse motor to bring a throttle valve of an internal combustion engine installed in the vehicle toward a closed position thereof to thereby suppress the excessive slip. When a state that a detected value of throttle valve opening is smaller than a detected value of accelerator pedal angle while the pulse motor is in stoppage has continued over a predetermined period of time, the ECU determines the initial position of the pulse motor by storing the detected throttle valve opening value as a reference value of the pulse motor position. If the initial pulse motor position has not been determined when a second predetermined period of time has elapsed after the pulse motor started to be driven to bring the throttle valve toward its fully closed position, a throttle system of the engine is determined to be abnormal, and then the pulse motor is forcedly driven to bring the throttle valve into its fully open position. After completion of pulse motor control for suppression of the excessive slip, the ECU carries out open loop control for driving the pulse motor to bring the throttle valve into a substantially fully open position irrespective of whether or not the initial position of the pulse motor has been determined.

7 Claims, 9 Drawing Sheets

| FIG.2A | FIG.2B |

DRIVING WHEEL CONTROL SYSTEM FOR AUTOMOTIVE VEHICLES

BACKGROUND OF THE INVENTION

This invention relates to a driving wheel control system which suppresses excessive slip of driving wheels of an automotive vehicle, and more particularly to a driving wheel control system of this kind which is adapted to reduce the output of an engine installed in the vehicle by controlling the opening degree of a throttle valve of the engine to thereby suppress excessive slip of the driving wheels.

A throttle valve of an internal combustion engine installed in an automotive vehicle is usually operated by means of an accelerator pedal. A driving wheel control system is known, which is called "traction control system" (hereinafter referred to as "TCS"). This system is operable upon slippage of a driving wheel or driving wheels depending upon road conditions to drive the throttle valve toward a smaller opening degree by means of a pulse motor, independently of the position of the accelerator pedal, to thereby temporarily reduce the engine output and hence promptly eliminate slip of the driving wheel(s).

On the other hand, a pulse motor in general is controlled in open loop mode such that its position is determined by the number of stepping pulses generated in accordance with the difference between a predetermined reference position (initial position) and a desired position, as disclosed in Japanese Provisional Patent Publication (Kokai) No. 62-821995. However, before the reference position is determined or initialized, i.e. at the time of resetting or initialization of a computer which controls the pulse motor, the actual position of the pulse motor is unknown. Therefore, on such an occasion the pulse motor has to be controlled in feedback mode in response to the difference between the actual position of the pulse motor sensed by a motor position sensor (throttle valve opening sensor) and a desired position so that the former becomes equal to the latter, as disclosed e.g. in Japanese Provisional Patent Publication (Kokai) No. 61-94597.

In the case where the TCS carries out the throttle valve control by the use of a pulse motor in feedback mode as mentioned above with an actual opening degree (hereinafter abbreviated as "opening") of the throttle valve detected by a throttle valve opening sensor being a reference value of the motor position, the feedback control has degraded control accuracy due to output characteristic errors attributed to non-linearity in the sensor output, hysteresis, dead zone, etc.

Therefore, once the reference position of the pulse motor has been determined, the throttle valve control of the TCS by the use of a pulse motor should be carried out in open loop mode in order to achieve high control accuracy.

To carry out the open loop control with high accuracy, it is essential to accurately determine the reference position of the pulse motor. However, when the TCS is at rest, the pulse motor is kept inoperative in a waiting position corresponding to a fully open position of the throttle valve, whereas upon the start of the TCS it is driven in the direction of moving the throttle valve toward its closed position. That is, the motor position and the throttle valve opening do not always coincide with each other. As a result, if the detected opening value of the throttle valve opening sensor is stored as a reference position of the pulse motor in order to carry out the open loop control when the positional relationship between the motor and the throttle valve is still uncertain such as at or immediately after the start of the TCS, the stored reference position can be incorrect, resulting in the throttle valve being controlled into an improper position.

Therefore, the reference position of the pulse motor should not be determined until after a predetermined initialization condition is satisfied when the positional relationship between the pulse motor and the throttle valve has become stable after the pulse motor was driven from its waiting position upon the start of operation of the TCS.

On the other hand, in the case where the throttle valve control by a pulse motor is carried out in feedback mode before the determination of the reference position of the pulse motor as mentioned above, there arises the following problem:

When the throttle system (the pulse motor, the throttle valve and its peripheral elements) is normally functioning, the pulse motor ought to be driven into a position corresponding to the desired position of the throttle valve from the waiting position corresponding to the fully open position of the throttle valve, within a predetermined time of period (e.g. 1 sec.) from the time a TCS operating condition (a condition under which the pulse motor needs to be controlled to a closed position) becomes satisfied.

However, in the event of occurrence of any of the following phenomena, the pulse motor cannot be properly driven, so that the aforementioned initialization condition remains unsatisfied even after the lapse of the above predetermined period of time after the fulfillment of the TCS operating condition:

i) Skipping of the pulse motor due to shortage of motor torque caused by a drop in a supply voltage from the battery;

ii) Biting of the throttle valve and bending of the link;

iii) Temporary failure of the throttle valve or the like.

If in such a case as above fulfillment of the initialization condition is awaited, the feedback control is continued based upon incorrect detected opening of the throttle valve due to failure of the throttle system, whereby the pulse motor cannot be moved to the desired position, resulting in failure to properly reduce the engine output and hence eliminate slip of the driving wheel(s).

Upon the start of the TCS, the pulse motor is driven from a waiting position corresponding to the fully open position of the throttle valve and in the direction of closing the throttle valve, while during operation of the TCS the throttle valve is moved to a desired opening $\theta_{THO}$ in the vicinity of its fully closed position and held thereat. When slip of the driving wheel(s) has been dissipated, the TCS is rendered inoperative and then the pulse motor is again moved back to the waiting position corresponding to the fully open position of the throttle valve and then deenergized to be held thereat.

However, in the case where the operating time of the TCS is so short that the TCS is rendered inoperative before the initial or reference position of the pulse motor is determined, if the pulse motor is driven to open the throttle valve by the feedback control in such a case, the output from the throttle valve opening sensor does not show a larger opening value than the accelerator pedal angle even when the pulse motor is supplied with a driving signal for opening the throttle valve so that it is driven into the waiting position corresponding to the fully open position of the throttle valve. Since in the feedback control the output from the throttle valve opening sensor is regarded as the pulse motor position, it cannot be determined that the pulse motor has been driven into the waiting position corresponding to the fully open position of the throttle valve. As a result, there occurs an inconvenience that the above driving signal continues to be supplied to the pulse motor.

SUMMARY OF THE INVENTION

A first object of the invention is to provide a driving wheel control system for automotive vehicles, using a pulse motor for driving a throttle valve, which is capable of accurately determining the initial position of the pulse motor and hence controlling the position of the throttle valve with high accuracy.

A second object of the invention is to accurately detect failure of the throttle system, and in the event of such failure, prevent the driving wheels from being controlled by incorrect control of the throttle valve and perform a proper fail-safe function.

A third object of the invention is to enable to drive the pulse motor so as to positively bring same into its waiting position corresponding to a fully open position of the throttle valve even when the TCS operating time is so short that the TCS is rendered inoperative before the initial position of the pulse motor is determined.

To attain the first object, the present invention provides a control system for controlling driving wheels of an automotive vehicle provided with an internal combustion engine having a throttle system including a throttle valve, and an accelerator pedal, the system including engine output-reducing means having a pulse motor disposed to drive the throttle valve, and throttle valve control means responsive to a slip state of at least one of the driving wheels for causing the pulse motor to drive the throttle valve in a direction of closing same or in a direction of opening same, wherein the engine output-reducing means is operable upon detection of excessive slip of at least one of the driving wheels to drive the throttle valve in the direction of closing same for reducing output of the engine to thereby suppress the excessive slip.

The system according to the invention is characterized by the improvement comprising:

first detecting means for detecting opening of the throttle valve;

second detecting means for detecting an angle of the accelerator pedal; and initial position-determining means for determining an initial position of the pulse motor, the initial position-determining means being operable to store a value of the opening of the throttle valve detected by the first detecting means as a reference value of a position of the pulse motor when a state that the detected value of the opening of the throttle valve is smaller than a value of the angle of the accelerator pedal detected by the second detecting means while the pulse motor is in stoppage has continued over a predetermined period of time.

Preferably, the control system includes:

feedback control means for controlling the position of the pulse motor with reference to values of the opening of the throttle valve detected by the first detecting means before the storing of the reference value of the position of the pulse motor by the initial position-determining means; and open loop control means for controlling the position of the pulse motor with reference to the reference value stored by the initial position-determining means after the storing of the reference value by the initial position-determining means.

Further preferably, the control system includes:

means for calculating a desired value of the opening of the throttle valve;

means for comparing the desired value of the opening of the throttle valve with the reference value of the position of the pulse motor; and means for causing the initial position-determining means to again store a value of the opening of the throttle valve detected by the first detecting means as the reference value of the position of the pulse motor when the desired value of the opening of the throttle valve is smaller than the reference value.

To attain the second object, the control system includes abnormality-determining means for determining that the throttle system is abnormal if the initial position of the pulse motor has not yet been determined when a second predetermined period of time has elapsed after the pulse motor started to drive the throttle valve toward a fully closed position thereof, and forced driving means for forcedly driving the pulse motor to bring the throttle valve into a fully open position thereof when the throttle valve is determined to be abnormal.

Preferably, the engine output-reducing means further includes at least one of fuel injection quantity-reducing means and ignition timing-retarding means, the engine output-reducing means disabling the throttle valve control means and actuating at least one of the fuel injection quantity-reducing means and the ignition timing-retarding means when the throttle valve is determined to be abnormal.

To attain the third object, the control system includes throttle valve-driving means for disabling the engine output-reducing means and driving the pulse motor to bring the throttle valve into a fully open position thereof by open loop control irrespective of whether or not the initial position of the pulse motor has been determined, when the excessive slip of at least one of the driving wheels has been suppressed.

The above and other objects, features, and advantages of the invention will be more apparent from the following detailed description taken in conjunction with the accompanying drawings.

DETAILED DESCRIPTION

The invention will now be described in detail with reference to the drawings showing embodiments thereof.

Figure 1:
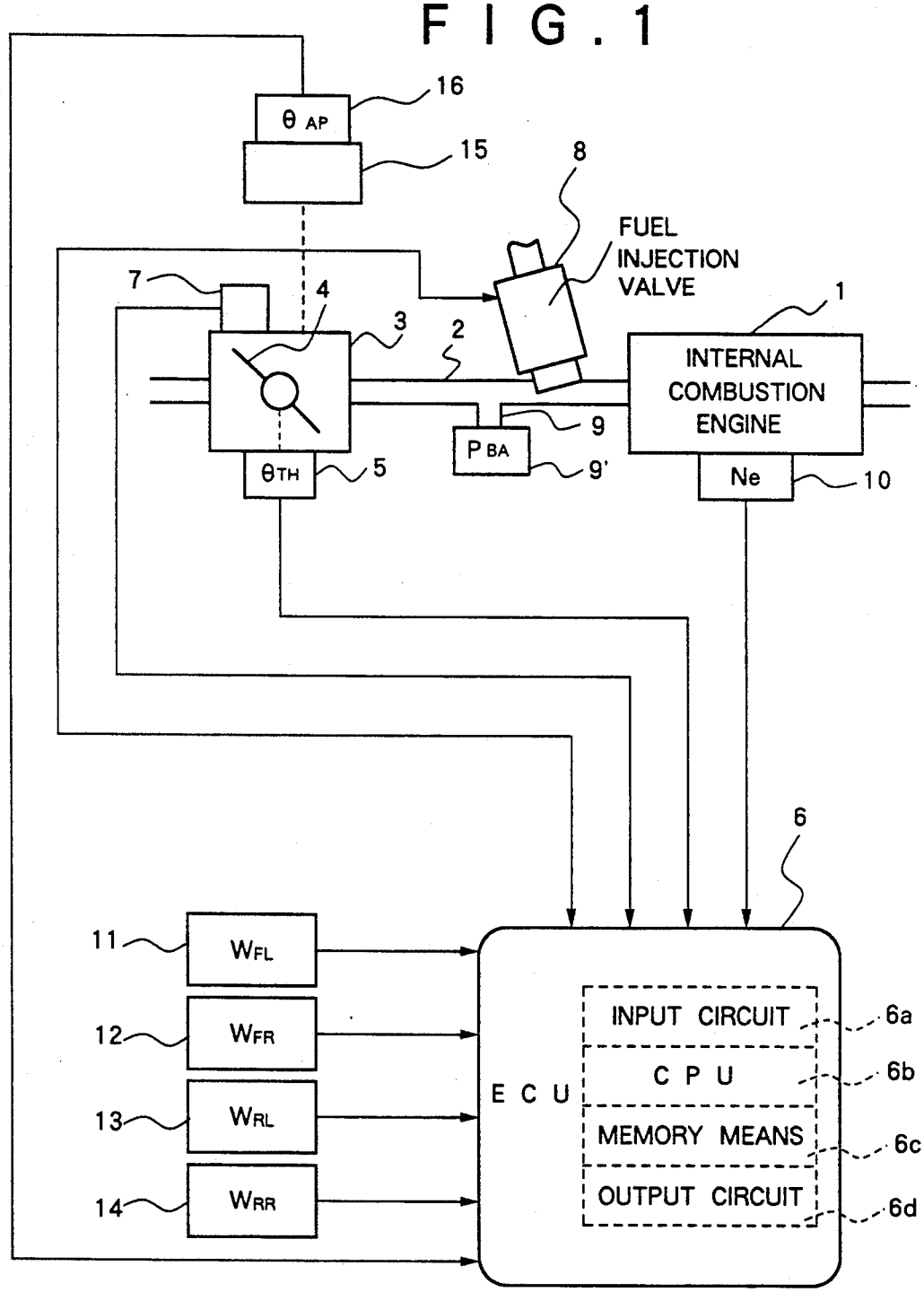
FIG. 1 is a block diagram showing the whole arrangement of a driving wheel control system according to the invention.

Referring first of FIG. 1, there is illustrated the whole arrangement of a traction control system (TCS) according to an embodiment of the invention. In the figure, reference numeral 1 designates an internal combustion engine installed in an automotive vehicle, which has an intake pipe 2 across which is arranged a throttle body 3 accommodating a throttle valve 4. Connected to the throttle valve 4 is a throttle valve opening ($\theta_{TH}$) sensor 5 which generates an electric signal indicative of the sensed opening of the throttle valve 4 and supplies same to an electronic control unit (hereinafter called "ECU") 6.

Further connected to the throttle valve 4 by a wire, not shown, is an accelerator pedal 14 of the automotive vehicle, to which is connected an accelerator pedal angle ($\theta_{AP}$) sensor 15, which generates an electric signal indicative of the sensed accelerator pedal angle and supplies same to the ECU 6.

A pulse motor 7 is connected to the throttle valve 4 for driving same.

When the TCS is not in operation, i.e. during normal operation where no excessive slip occurs, the throttle valve 4 is operated by the accelerator pedal 14 via the wire, whereas when the TCS is operative, the throttle valve 4 is driven by the pulse motor 7 in a manner described hereinafter.

Fuel injection valves 8, only one of which is shown, are provided for respective engine cylinders and each arranged in the intake pipe 2 at a location intermediate between the cylinder block of the engine 1 and the throttle valve 4 and slightly upstream of an intake valve, not shown, of the corresponding cylinder. The valves 8 are connected to a fuel pump, not shown, and electrically connected to the ECU 6 to have their valve opening periods controlled by signals therefrom.

An intake pipe absolute pressure (PBA) sensor 9' is connected to the interior of the intake pipe 2 via a conduit 9 immediately downstream of the throttle valve 4, for sensing absolute pressure in the intake pipe 2 and supplying an electric signal indicative of the sensed absolute pressure to the ECU 6.

An engine rotational speed (Ne) sensor 10 is arranged in facing relation to a camshaft of the engine 1 or a crankshaft thereof, neither of which is shown. The engine rotational speed sensor 10 generates a TDC signal pulse at each of predetermined angles of the crankshaft of the engine 1 whenever the crankshaft rotates through 180 degrees, the TDC signal pulse being supplied to the ECU 6.

Further connected to the ECU 6 are driving wheel speed sensors 11 and 12 for sensing the rotational speeds $W_{FL}$, $W_{FR}$ of respective left and right driving wheels, not shown, of the automotive vehicle, and trailing wheel speed sensors 13 and 14 for sensing the rotational speeds $W_{RL}$, $W_{RR}$ of respective left and right trailing wheels, not shown, of the automotive vehicle. Output signals from these sensors are also supplied to the ECU 6.

The ECU 6 comprises an input circuit 6a having the functions of shaping the waveforms of input signals from the various sensors, shifting output voltage levels of some analog-output sensors into a predetermined level, etc., a central processing circuit (hereinafter called "CPU"), memory means 6c storing various control programs executed by the CPU 6b and for storing results of calculations carried out by the CPU 6b, etc. and an output circuit 6d for supplying respective driving signals to the fuel injection valves 8 and the pulse motor 7.

The CPU 6b is operable in response to output signals from the above-mentioned various engine operating parameter sensors to determine operating conditions of the engine and calculate based upon the determined operating conditions of the engine the fuel injection period $T_{OUT}$ of the fuel injection valves 8 by the use of the following equation (1):

$$T_{OUT} = Ti \times K_1 + K_2 \quad (1)$$

where Ti represents a basic value of the fuel injection period which is determined as a function of the engine rotational speed Ne and the intake pipe absolute pressure PBA, $K_1$ and $K_2$ are other correction coefficients and correction variables which are calculated in response to output signals from various engine operating parameter sensors to values appropriate to the determined operating conditions of the engine so as to optimize various operating characteristics of the engine such as fuel consumption and accelerability.

The CPU 6b supplies driving signals to the fuel injection valves 8 through the output circuit 6c to open them over the thus calculated fuel injection period $T_{OUT}$.

Further, the ECU 6 calculates based upon output signals from the speed sensors 11–14 an average value $V_W [=(W_{FL}+W_{FR})/2]$ of the left and right driving wheel speeds as well as an average value $V_V[=(W_{RL}+W_{RR})/2]$ of the left and right trailing wheel speeds, and then calculates based upon the calculated average values $V_W$, $V_V$ a slip rate $\lambda$ by the use of the following equation (2):

$$\lambda = (V_W - V_V)/V_w \quad (2).$$

If the slip rate $\lambda$ exceeds a predetermined value (e.g. 5%), the ECU 6 supplies a control signal to the pulse motor 7 to thereby control the throttle valve opening $\theta_{TH}$.

Figures 2, 2A:
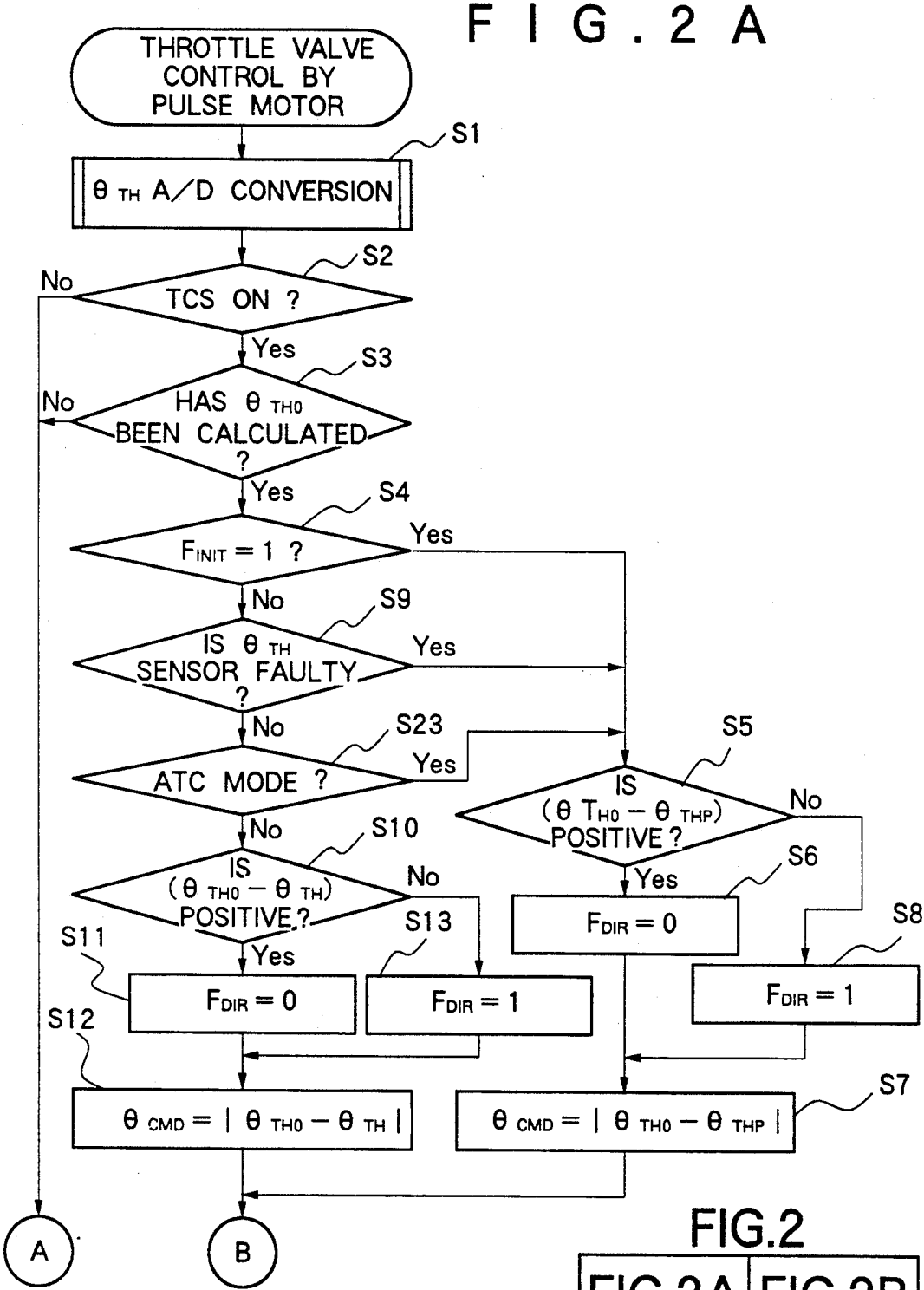
FIGS. 2A and 2B are flowchart showing a program for controlling a throttle valve in FIG. 1 by the control system of FIG. 1.
Figure 2B:
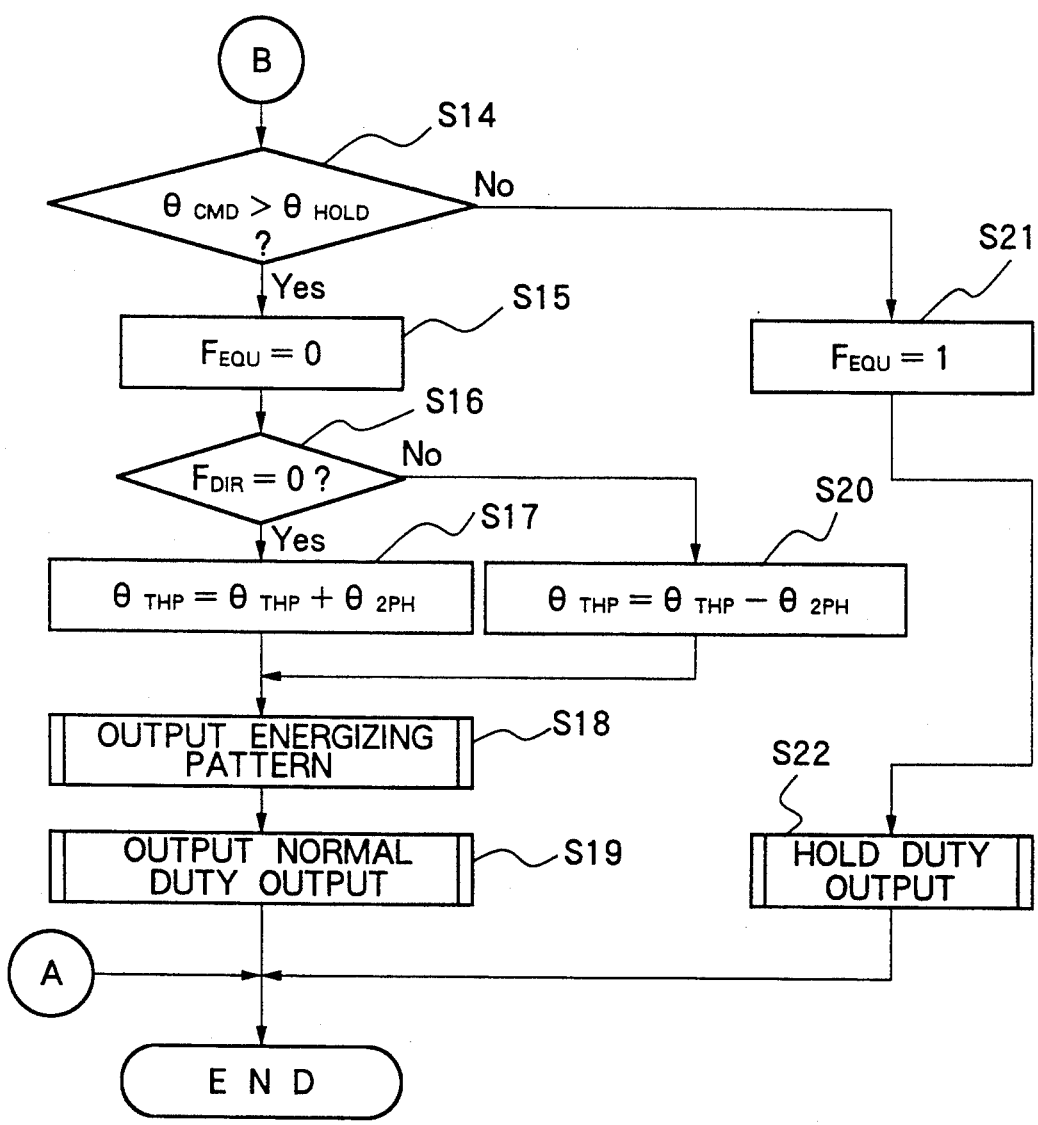

FIG. 2 shows a flowchart of a program for controlling the TCS in FIG. 1. This program is executed by the ECU 6 at predetermined time intervals (e.g. 2 ms) by means of a timer provided in the ECU 6.

First, at a step S1, a value of the throttle valve opening $\theta_{TH}$ sensed by the throttle valve opening sensor 5 is subjected to analog-to-digital conversion. Then, at a step S2, it is determined whether or not the TCS is in operation. As mentioned before, the TCS operates to judge that an excessive slip of the driving wheels has occurred when the slip rate $\lambda$ of the driving wheels exceeds a predetermined value (e.g. 5%), and then operates to promptly eliminate the excessive slip of the driving wheels. If the answer to the question of the step S2 is No, that is, when the TCS is inoperative (i.e. during normal operation), the program is immediately terminated, whereby the throttle valve 4 is controlled by operation of the accelerator pedal 14. On this occasion, the pulse motor 7 is also inoperative in a waiting position to allow the throttle valve 4 to remain in a fully open position [(a) of FIG. 4].

If the answer to the question of the step 2 is Yes, that is, if the TCS is in operation, it is determined whether or not a desired value $\theta_{THO}$ of opening of the throttle valve 4 has been calculated (step S3). The desired opening $\theta_{THO}$ of the throttle valve 4 is calculated by the use of a predetermined equation based upon a slip rate of the driving wheels calculated by the use of the equation (2) at the start of operation of the TCS, to such a value as to obtain a sufficient amount of reduction in the engine output to promptly eliminate an excessive slip of the driving wheels. The calculation of the desired valve opening $\theta_{THO}$ is carried out whenever a second predetermined period of time (e.g. 10 ms) elapses, by the use of a second timer.

Figure 4:
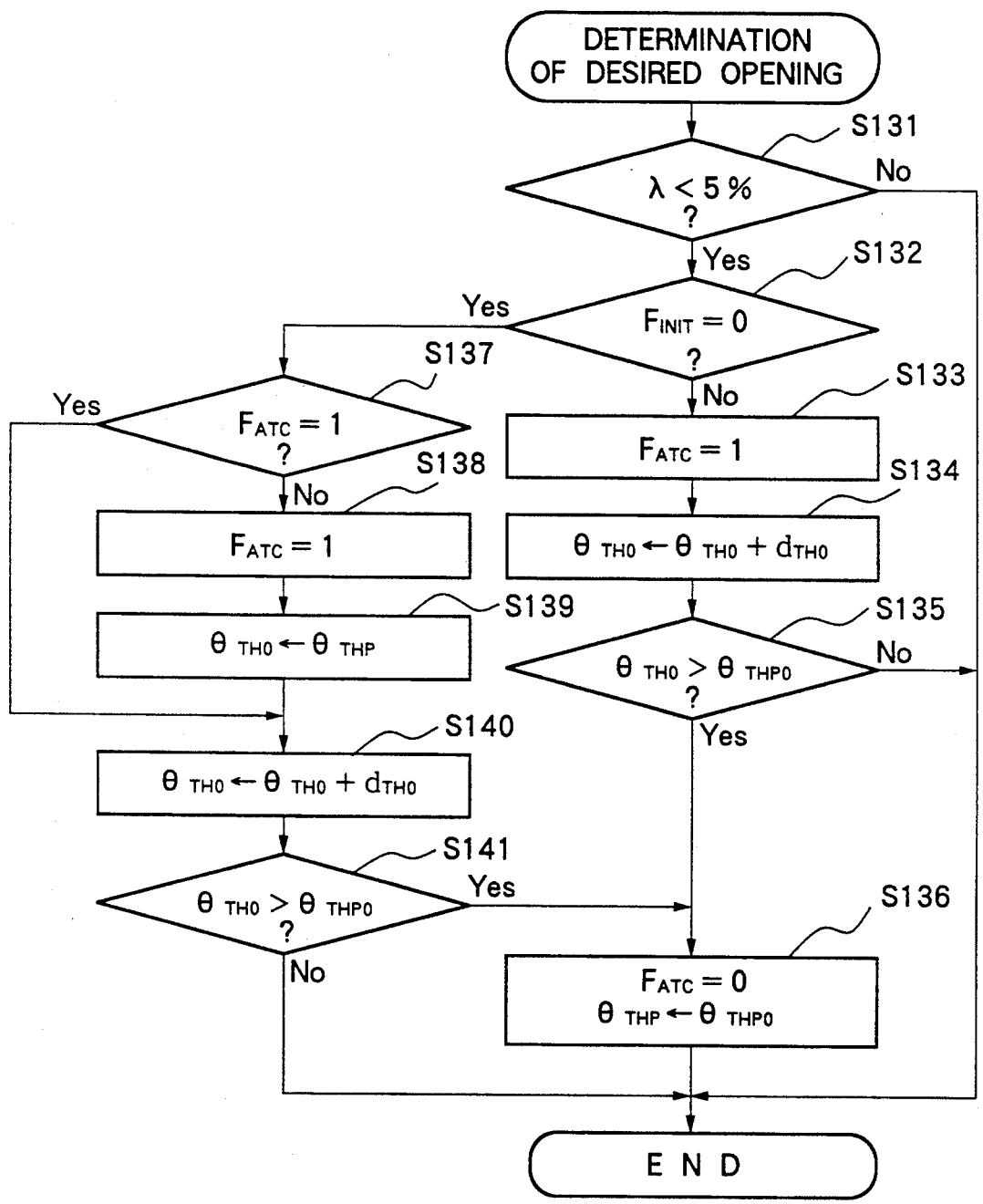
FIG. 4 is a flowchart for setting desired opening of the throttle valve in after-TCS operation (ATC) mode.
Figure 5:
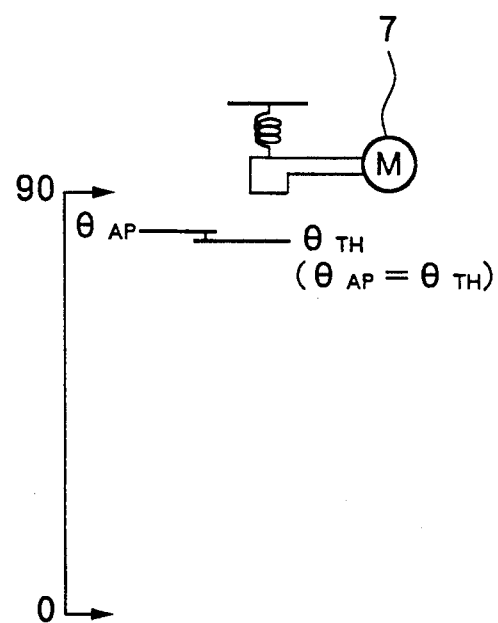
FIGS. 5(a)-5(c) are schematic views showing the positional relationship between the accelerator pedal, throttle valve, and pulse motor.
Figure 5:
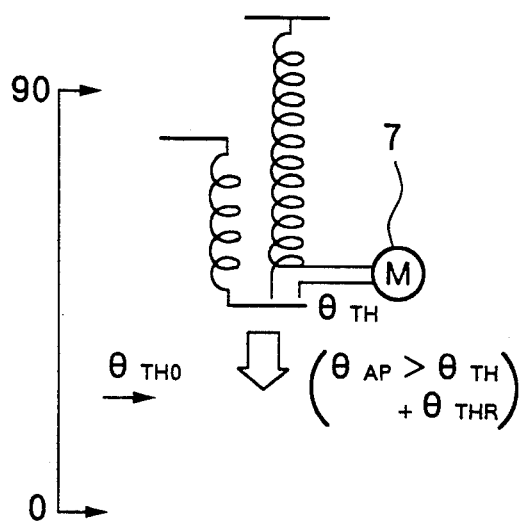
Figure 5:
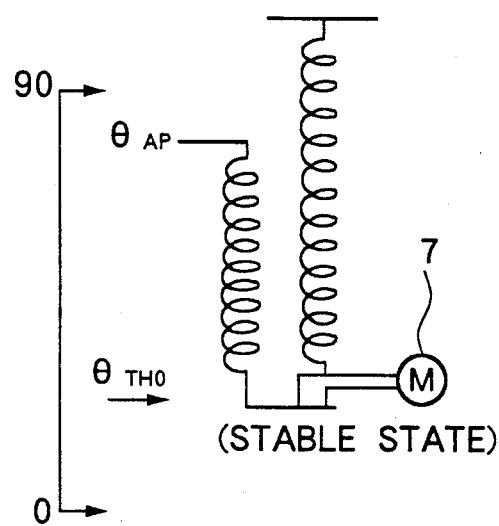

If the answer to the question of the step S3 is Yes, that is, if the desired valve opening $\theta_{THO}$ has been calculated, the throttle valve 4 is driven toward a closed position thereof by the pulse motor 7 [(b) of FIG. 4]. At the same time, the CPU 6b executes a step S4 et seq., hereinafter referred to, in order to make the throttle valve opening $\theta_{TH}$ equal to the desired valve opening $\theta_{THO}$. If the answer to the question of the step S3 is No, the program is immediately terminated, since then the desired valve opening $\theta_{THO}$ has not yet been calculated.

At the step S4, it is determined whether or not a flag $F_{INIT}$ assumes a value of 1, that is, whether or not a reference value of the pulse motor position has been determined. The reference value of the pulse motor position, which is an initial position of the pulse motor 7, is used during control of the pulse motor position in open loop mode. The determination of the step S4 is carried out by a program shown in FIG. 3. The flag $F_{INIT}$ is set to 1 when the reference value of the motor position has been determined.

If the answer to the step S4 is Yes, that is, if the reference value has been determined (when the flag $F_{INIT}$ has been set to 1 at a step S39 in FIG. 3), a determination is made as to whether or not the difference $(\theta_{THO}-\theta_{THP})$ between the desired throttle valve opening $\theta_{THO}$ and a count value $\theta_{THP}$ in a pulse counter, hereinafter referred to, assumes a positive value, at a step S5. If the answer is Yes, that is, if the difference $(\theta_{THO}-\theta_{THP})$ is positive, a flag $F_{DIR}$ is set to a value of 0 at a step S6, and an absolute value $[\theta_{THO}-\theta_{THP}]$ is adapted as a command value $\theta_{CMD}$ for opening the throttle valve, at a step S7. If the answer to the question of the step S5 is No, that is, if $(\theta_{THO}-\theta_{THP})$ assumes a negative value, the flag $F_{DIR}$ is set to 1 at a step S8, and then the program proceeds to the step S7.

On the other hand, if the answer to the question of the step S4 is No, that is, if the reference value of the pulse motor position has not yet been determined, i.e. if the flag $F_{INIT}$ assumes 0, it is determined at a step S9 whether or not the throttle valve opening sensor 5 is faulty (e.g. a disconnection in the wiring). If the answer is No, that is, if the sensor is normally functioning, it is determined at a step S23 whether or not an ATC mode condition is satisfied immediately after termination of TCS operation. The ATC mode condition is a condition for controlling the pulse motor 7 to bring the throttle valve 4 into its fully open position immediately after excessive slip of the driving wheels has been suppressed. This determination is made based upon whether or not a flag $F_{ATC}$, which is set to 1 when the ATC mode condition is satisfied at a step S133 in FIG. 4, hereinafter referred to, assumes a value of 1. If the answer is No, that is, if the ATC mode condition is not satisfied, the program proceeds to a step S10, hereinafter described, whereas if the ATC mode condition is satisfied, the program proceeds to the step S5. At the step S10, it is determined whether or not the difference $(\theta_{THO}-\theta_{TH})$ between the desired throttle valve opening $\theta_{THO}$ and the actual value $\theta_{TH}$ sensed in the present loop assumes a positive value. If the difference assumes a positive value, the flag $F_{DIR}$ is set to 0, at a step S11, and the absolute difference value $[\theta_{THO}-\theta_{TH}]$ is adapted as the throttle valve opening command value $\theta_{CMD}$, similarly to the step S7, at a step S12. If the answer to the question of the step S10 is No, that is, if the difference $(\theta_{THO}-\theta_{TH})$ is negative, the flag $F_{DIR}$ is set to 1 at a step S13, followed by the program proceeding to the step S12, whereas if the answer to the question of the step S9 is Yes, that is, if the throttle valve opening sensor 5 is faulty, the program proceeds to the step S5.

In the above described manner, setting of the flag $F_{DIR}$ is made depending upon the sign of the difference $(\theta_{THO}-\theta_{THP})$ or $(\theta_{THO}-\theta_{TH})$ between the desired throttle valve opening value and the pulse counter value $\theta_{THP}$ or the throttle valve opening $\theta_{TH}$ in order to determine the direction of rotation of the pulse motor 7 (steps S6, S8, S11 and S13), and the differences $(\theta_{THO}-\theta_{THP})$, $(\theta_{THO}-\theta_{TH})$ are adapted as the throttle valve opening command value (the number of output pulses) $\theta_{CMD}$ (steps S7, S12).

Open loop control based upon the pulse counter value $\theta_{THP}$ is carried out in response to the difference $(\theta_{THO}-\theta_{THP})$ obtained in the step S7, whereas feedback control based upon the throttle valve opening $\theta_{TH}$ is carried out in response to the difference $(\theta_{THO}-\theta_{TH})$ obtained in the step S12.

Figure 3:
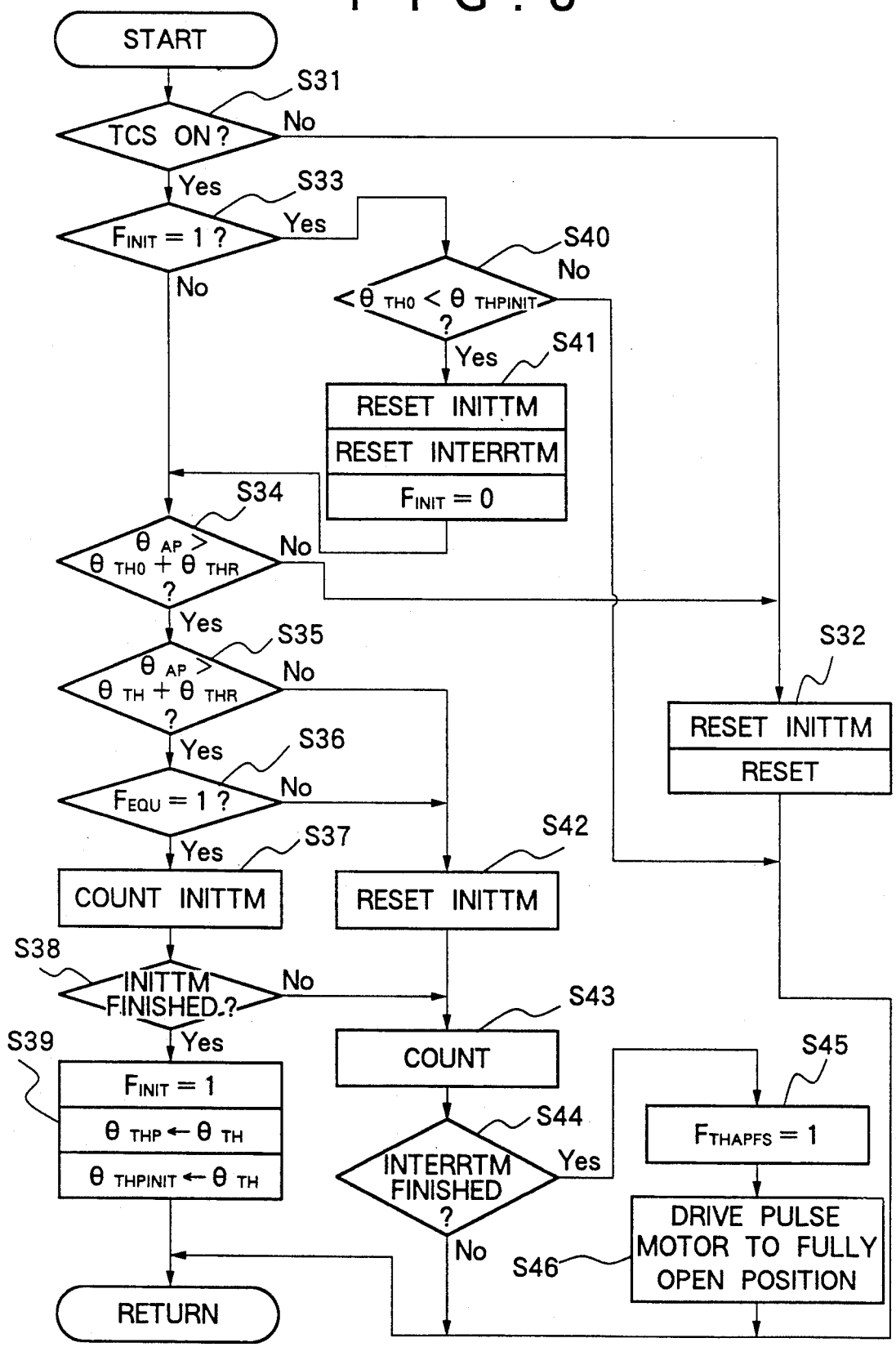
FIG. 3 is a flowchart showing a program for determining the initial position of a pulse motor in FIG. 1 and detecting abnormality in the throttle system.

Further, since the steps S5 et seq. are carried out even when the throttle valve opening sensor 5 is faulty as a result of the determination of the step S9, it is possible to prevent the pulse counter value $\theta_{THP}$ from assuming an abnormal value during the next determination of the pulse motor reference position which is executed when the answer to the question of a step S40 in FIG. 3 is Yes, and the pulse motor 7 can be continually driven by open loop control based upon the counter pulse value $\theta_{THP}$.

Then, the program proceeds to a step S14 where it is determined whether or not the throttle valve opening command value $\theta_{CMD}$ determined by the step S7 or S12 is larger than a threshold value $\theta_{HOLD}$ for determining whether to generate output pulses for energizing the pulse motor in "two-phase energization mode" (mode where two excitation coils are energized at the same time), hereinafter described. If the answer to the question of the step S14 is Yes, that is, $\theta_{CMD}>\theta_{HOLD}$, the program proceeds to a step S15 where a flag $F_{EQU}$ used at a step S36 in FIG. 3, is set to 0. The flag $F_{EQU}$ is set to 1 when the pulse motor is stopped, while it is set to 0 when the pulse motor 7 is rotated. Then, a determination is made as to whether or not the flag $F_{DIR}$ has a value of 0 at a step S16. If the answer is Yes, the pulse counter value $\theta_{THP}$ is increased by a unit advance amount $\theta_{2PH}$ used in the two-phase energization mode for the pulse motor 7, at a step S17, to obtain a new pulse counter value $\theta_{THP}$ to be applied in the next loop to thereby drive the pulse motor in the direction of opening the throttle valve 4. The step S17 is followed by a step S18 where a normal control signal having a pulse duty factor of 50% is outputted at a step S19, followed by termination of the program.

On the other hand, if the answer to the question of the step S16 is No, that is, if the flag $F_{DIR}$ assumes 1, the pulse counter value $\theta_{THP}$ is decreased by the amount $\theta_{2PH}$ to obtain a new pulse counter value $\theta_{THP}$ to be applied in the next loop (step S20), to thereby drive the pulse motor 8 in the direction of closing the throttle valve 4. Then, the program proceeds to steps S18 and S19.

On the other hand, if the answer to the question of the step S14 is No, that is, $\theta_{CMD} \leq \theta_{HOLD}$, the flag $F_{EQU}$ is set to 1 at a step S21, and the pulse motor is stopped at a step S22, followed by termination of the program. Specifically, the pulse motor 7 is held in stoppage by a predetermined amount of holding current supplied thereto.

FIG. 3 shows a program for determining the initial position of the pulse motor and detecting abnormality in the throttle system. This program is executed at predetermined time intervals (e.g. 10 ms).

In FIG. 3, first at a step S31, it is determined whether or not the TCS is in operation. If the TCS is not in operation (i.e. during normal operation), the program proceeds to a step S32 to reset an initial timer INITTM which sets a predetermined time period forming one of factors for determining the initial position of the pulse motor 7, and also reset an initial error timer INTERRTM which sets a predetermined time period used to detect a fault in the throttle system (the pulse motor, the throttle valve and its peripheral parts), followed by termination of the program.

If the answer to the question of the step S31 is Yes, that is, if the TCS is in operation, it is determined whether or not the flag $F_{INIT}$ has been set to 1 at the next step S33, The flag $F_{INIT}$ is set to 1 at a step S39, hereinafter referred to, when the reference value of the motor position (initial motor position) has been determined. If the answer to the question of the step S33 is No, that is, if the flag FINIT assumes 0, it is determined at a step S34 whether or not the accelerator pedal angle $\theta_{AP}$ is larger than the sum of the desired opening value $\theta_{THO}$ and a correction amount $\theta_{THR}$ for a detection error of the throttle valve opening sensor 5. If the answer to the question of the step S34 is No, that is, if the accelerator pedal is not stepped on to an angle larger than the desired opening value $\theta_{THO}$, the program proceeds to the step S32, where the initial timer INITTM and the initial error timer INTERRTM are both reset, followed by terminating the program. On the other hand, if the answer to the question of the step S34 is Yes, that is, if the accelerator pedal 4 is stepped on to an angle larger than the desired opening value $\theta_{THO}$, the program proceeds to a step S35, where it is determined whether or not the accelerator pedal angle $\theta_{AP}$ is larger than the sum of the detected throttle valve opening $\theta_{TH}$ and the correction amount $\theta_{THR}$ for the detection error. If the answer is Yes, that is, if the throttle valve 4 has been driven toward its closed position by the pulse motor 7 so that the accelerator pedal angle $\theta_{AP}$ becomes larger than the sum of the actual throttle valve opening $\theta_{TH}$ and the correction amount $\theta_{THR}$ [(b) of FIG. 4], it is determined whether the flag $F_{EQU}$ assumes 1, at a step S36. if the answer is Yes, that is, if the pulse motor 7 is stopped so that the flag $F_{EQU}$ is set to 1, in other words, if the accelerator pedal is stepped on to a degree larger than the desired valve opening $\theta_{THO}$, and the accelerator pedal opening $\theta_{AP}$ is larger than the actual throttle valve opening $\theta_{TH}$, and at the same time the pulse motor 7 is stopped (that is, when all the answers to the questions of the steps S34, S35, and S36 are Yes), the initial timer INITTM is started to count or is continued to count at a step S37. Incidentally, the counting is started in a loop immediately after the TCS is turned on (when the answer to the question of the step S31 is Yes), and thereafter the counting is continued so long as the program passes this loop thereafter. At the next step S38, it is determined whether or not the initial timer INITTM has completed counting, that is, whether or not a state that $\theta_{AP} > \theta_{TH} + \theta_{THR}$ and the flag $F_{EQU} = 1$ has continued over a predetermined period of time (e.g. 20 ms) (step S38). If the answer to the question of the step S38 is Yes, that is, if the above state has continued over the above predetermined period of time, which means that the predetermined condition for determining the initial position of the pulse motor has been satisfied, it is regarded that the positional relationship between the pulse motor 7 and the throttle valve opening sensor 5 is stable [(c) of FIG. 4] and then the throttle valve opening value $\theta_{TH}$ then detected is stored into the pulse counter within the ECU 6 as a pulse counter value $\theta_{THP}$, and at the same time the same detected throttle valve opening value $\theta_{TH}$ is stored into the memory means 6c as a reference value $\theta_{THPINIT}$ of the pulse motor position, and further the flag $F_{INIT}$ is set to 1, at a step S39, followed by terminating the program. When the pulse motor 7 and the throttle valve opening sensor 5 are in a stable positional relationship as shown in (c) of FIG. 4, the actual throttle valve opening $\theta_{TH}$ is almost equal to the desired throttle valve opening value $\theta_{THO}$.

As described above, according to the invention, when the predetermined condition for determining the initial position of the pulse motor, that is, a state that the accelerator pedal angle $\theta_{AP}$ is larger than the throttle valve opening $\theta_{TH}$ and at the same time the pulse motor 7 is in stoppage, has continued over the predetermined period of time, it is regarded that the pulse motor position and the throttle valve opening $\theta_{TH}$ are in a stable positional relationship, and then the throttle valve opening $\theta_{TH}$ then detected is determined to be used as the reference value $\theta_{THINIT}$ of the pulse motor position, and stored into the pulse counter as a count value $\theta_{THP}$. Therefore, the pulse motor position can be carried out with high accuracy by open loop control with reference to the thus stored pulse counter value $\theta_{THP}$.

Referring again to the step S33, if the answer is Yes, that is, if the flag $F_{INIT}$ assumes 1, which means that the reference value of the pulse motor position has been determined, it is determined at a step S40 whether or not the determination of the initial position of the pulse motor is to be again carried out, in other words, whether or not the desired throttle valve opening value $\theta_{THO}$ is smaller than the throttle valve opening value $\theta_{THPINIT}$ determined as the reference value of the motor position. If the answer is No, that is, if $\theta_{THO} \geq \theta_{THPINIT}$, the program is immediately terminated. On the other hand, if $\theta_{THO} < \theta_{THPINIT}$, the initial timer INITTM and the initial error timer INTERRTM are both reset, and the flag $F_{INIT}$ is set to 0 at a step S41, followed by executing the steps S34 through S39 to thereby again carry out determination of the initial position of the pulse motor 7. In this way, even after the reference value of the pulse motor position has been determined (the answer to the question of the step S33 is Yes), if the desired throttle valve opening value $\theta_{THO}$ has become smaller than the throttle valve opening value $\theta_{THPINIT}$ determined as the reference value of the motor position (the answer to the question of the step S40 is Yes), the determination of the motor initial position is again carried out at the steps S34 through S39. This is based upon the ground that the smaller opening area in which the throttle valve opening $\theta_{TH}$ is detected, the smaller the detection error, and the smaller throttle valve opening $\theta_{TH}$ determined as the reference value $\theta_{THPINIT}$ of the pulse motor position, the higher accuracy of the pulse motor position control, due to the aforementioned output characteristics of the throttle valve opening sensor 5.

On the other hand, if during operation of the TCS the accelerator pedal 4 has been stepped on to a degree larger than the desired throttle valve opening value $\theta_{THO}$ when the initial position of the pulse motor 7 has not yet been determined (the answers to the questions of the steps S31, S33, and S34 are Yes, No, and Yes, respectively), and at the same time the answer to the question of the step S35 is No, that is, the accelerator pedal angle $\theta_{AP}$ is smaller than the sum of the throttle valve opening $\theta_{TH}$ and the detection error correction amount $\theta_{THR}$, this means that the throttle valve 4 has not been driven toward its closed position by the pulse motor 7 due to skipping of the pulse motor, mechanical biting of the throttle valve, etc. In this case, at a step S42 the initial timer INITTM is reset, and then at a step S43 the initial error timer INTERRTM is started to count or continued to count (i.e., in the first loop after the TCS is turned on, it is started to count, and thereafter the counting is continued insofar as the present loop is continually executed).

Also, if the answer to the question of the step S35 is Yes, that is, if the pulse motor 7 is not stopped after the throttle valve 4 has been driven toward its closed position by the pulse motor 7 (the answer to the question of the step S36 is No, i.e., the flag $F_{EQU}=0$), the step S42 is executed to reset the initial timer INITTM, and then the step S43 is executed to cause the initial error timer INTERRTM to start counting or continue counting.

Further, also, if the pulse motor 7 is stopped after the throttle valve 4 has been driven toward its closed position by the pulse motor 7 so that the initial timer INITTM has been started to count (the answers to the questions of the steps S35, S36 are both Yes, and the step S37 has been executed), but the timer INITTM has not yet finished counting (the answer to the question of the step S38 is No), the step S43 is executed to cause the initial error timer INTERRTM to continue counting.

Figure 3A:
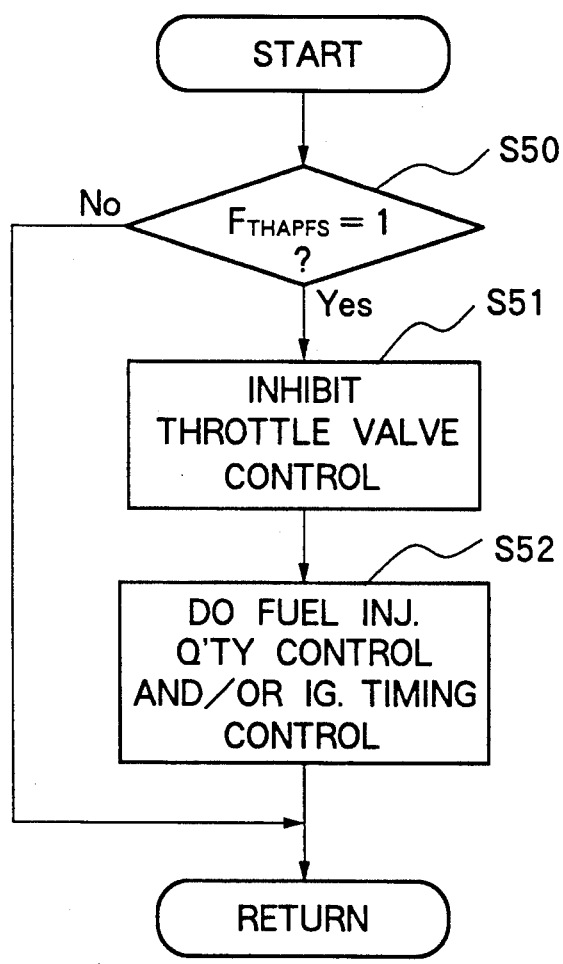
FIG. 3A is a flowchart showing a program for performing fail-safe operation in the event of occurrence of a fault in the throttle system.

At a step S44 following the step S43, it is determined whether or not the initial error timer INTERRTM has finished counting. The initial error timer INTERRTM continues counting so long as the answer to any of the steps S35, S36, and S38 for determining the predetermined condition for determining the initial position of the pulse motor is No, that is, so long as the predetermined condition is not satisfied, after the TCS is determined to have been turned on at the step S31 (step S43). If the answer to the question of the step S44 is Yes, that is, if the timer INTERRTM has finished counting when a predetermined period of time (e.g. 1 sec.) has elapsed, it is regarded that it is impossible to determine the initial position of the pulse motor 7, that is, a fault has occurred in the throttle system, and then a flag $F_{THAPFS}$ is set to 1, at a step S45, followed by termination of the program. When the flag $F_{THAPFS}$ has been set to 1, the pulse motor 7 is forcedly driven to a position (e.g. a waiting position) bringing the throttle valve into its fully open position at a step S46, and then the TCS control is switched over to at least one of control for reducing the fuel injection quantity and control for retarding the ignition timing, by a program shown in FIG. 3A. In FIG. 3A, it is determined at a step S50 whether or not the flag $F_{THAPFS}$ assumes a value of 1. If the answer is No, the program is immediately terminated. If the answer is Yes, execution of the throttle valve control by the pulse motor in FIG. 2 is inhibited at a step S51, and at least one of the fuel injection quantity-reducing control and the ignition timing-retarding control is executed at a step S52.

Reverting to FIG. 3, if the answer to the question of the step S44 is No, that is, if the initial error timer has not finished counting, the program is immediately terminated.

As described above, according to the invention, the initial error timer INTERRTM continues counting so long as any of the answers to the questions of the steps S35, S36, and S38 for determining the predetermined condition for determining the initial pulse motor position is No so that the initial pulse motor position is not determined. When the timer INTERRTM has counted over the predetermined period of time, it is judged that the throttle system is faulty. Therefore, accurate judgement can be made as to occurrence of abnormality in the throttle system. Furthermore, in the event of such abnormality, the throttle valve control is interrupted, thus enabling to prevent the driving wheels from being improperly controlled by the wrong throttle valve control. Moreover, when the throttle system is determined to be faulty, the pulse motor is forcedly returned to a position corresponding to the fully open position of the throttle valve, and thereafter the throttle valve control by the pulse motor is inhibited, thereby enabling to avoid any unfavourable effect of unstable throttle vale control and also prevent the throttle valve from being stopped in an intermediate position as well as poor accelerability of the engine which would be caused by the fact that the throttle valve is not opened to a required degree. Still further, when the throttle system is faulty, the TCS control can be switched over to at least one of fuel injection quantity-reducing control and ignition timing-retarding control, thereby enabling to secure exhibition of necessary functions of the TCS.

Next, reference is made to the flowchart of FIG. 2 described above and the flowchart of FIG. 4 to explain the manner of controlling the throttle valve 4 into the fully open position by the pulse motor 7 in after-TCS operation (ATC) mode which is determined at the step S23 in FIG. 2. FIG. 4 shows a program for setting the desired opening value $\theta_{THO}$ of the throttle valve 4 for use in ATC mode. This program is executed at predetermined time intervals (e.g. 10 ms). The desired valve opening value $\theta_{THO}$ for use in ATC mode is used in driving the pulse motor into the fully open position $\theta_{THPO}$ of the throttle valve by open loop control of steps S5–S7 in FIG. 2.

In FIG. 4, first at a step S131, it is determined whether or not a slip rate $\lambda$ of the driving wheels of the vehicle is smaller than a predetermined value (e.g. 5%). If the answer is No, that is, if the slip rate $\lambda$ is larger than the predetermined value, which means that excessive slip of the driving wheels has not yet been eliminated, the TCS control still has to be continued, and accordingly the present program is immediately terminated.

On the other hand, if the answer to the question of the step S131 is Yes, that is, if the slip rate $\lambda$ is smaller than the predetermined value, it is determined at a step S132 whether or not the aforementioned flag $F_{INIT}$ assumes 0, in other words, whether or not the reference value of the pulse motor position (initial position) has been determined. If the answer is No, that is, if the reference value has been determined, a flag $F_{ATC}$ is set to 1 to indicate that the ATC mode has been established, at a step S133.

Then, at a step S134, the present desired opening value $\theta_{THO}$ of the throttle valve 4 is increased by a predetermined value $d_{THO}$ to obtain a new desired opening value $\theta_{THO}$. If the present loop is the first loop after the ATC mode has been established, the desired valve opening value $\theta_{THO}$ which was obtained in the TCS control immediately before entering this ATC mode is directly used as the initial value of $\theta_{THO}$, since this value $\theta_{THO}$ is almost equal to the actual opening $\theta_{TH}$ of the throttle valve 4 (=the actual position of the pulse motor 7) which is in a stable state. From the next loop, a desired valve opening value $\theta_{THO}$ obtained in an immediately preceding loop is increased by the predetermined value $d_{THO}$, i.e. renewed. The up-to-date desired valve opening $\theta_{THO}$ thus obtained is used in determining the sign of the difference between the same value $\theta_{THO}$ and the pulse counter value $\theta_{THP}$ at the step S5 in FIG. 2 as well as in determining the valve opening command value $\theta_{CMD}$ for the throttle valve at the step S7 In FIG. 2. More specifically, after excessive slip of the driving wheels has been eliminated after determination of the pulse motor initial position, the present loop of the steps S131–S134 is repeatedly executed to gradually increase the desired valve opening $\theta_{THO}$ obtained so that the pulse motor 7 is driven to bring the throttle valve 4 toward its fully open position by the execution of the steps S5, S6. and S7, and S15, S16, S17, and S18 (open loop control), in the mentioned order. At a step S135 following the step S134 it is determined whether or not the desired valve opening value $\theta_{THO}$ thus increased is larger than the maximum angle position $\theta_{THPO}$ of the pulse motor 7 (e.g. 86°) corresponding to the fully open position of the throttle valve. If the answer is No, the program is immediately terminated, whereas if the answer is Yes, at a step S136 the flag $F_{ATC}$ is set to 0 to indicate completion of the ATC mode control, and the pulse counter value $\theta_{THP}$ is set to the value of the maximum opening position $\theta_{THPO}$, followed by termination of the program.

On the other hand, if the answer to the question of the step S132 is Yes, i.e. if the flag $F_{INIT}$ assumes 0, in other words, if excessive slip of the driving wheels has been eliminated while the initial position of the pulse motor 7 has not yet been determined, the program proceeds to a step S137 to determine whether or not the flag $F_{ATC}$ assumes 1. If the answer is No, that is, if the present loop is the first loop after the ATC mode has been established, the flag $F_{ATC}$ is set to 1 at a step S 138, and the present pulse counter value $\theta_{THP}$ is set to the desired opening value $\theta_{THO}$ of the throttle valve 4 at a step S139. As noted above, until the pulse motor 7 is again energized after completion of the ATC mode to start operation of the TCS, the pulse counter value $\theta_{THP}$ is set to the maximum opening value $\theta_{THPO}$ at the step S136 on the assumption that the pulse motor 7 is in the above maximum opening position $\theta_{THPO}$. On the other hand, until the initial position of the pulse motor 7 is determined after the start of energization of the pulse motor (i.e., after the start of the TCS control), the pulse counter value $\theta_{THP}$ is provisionally calculated with reference to the maximum opening position valve $\theta_{THPO}$. In the case where the ATC mode control is started before determination of the initial position of the pulse motor, the initial value of the desired throttle valve opening value $\theta_{THO}$ is set to the pulse counter value $\theta_{THP}$ thus provisionally calculated at the step S139.

On the other hand, if the answer to the question of the step S137 is Yes, that is, if the present loop is not the first loop after establishment of the ATC mode, the program skips over the steps S138 and S139 to a step S140.

At the step S140, like the step S134, hereinbefore referred to, the desired valve opening value $\theta_{THO}$ initialized at the step S139 or obtained in the last loop is increased by the predetermined value $d_{THO}$ into a new desired valve opening value $\theta_{THO}$ to thereby gradually increase the desired opening value $\theta_{THO}$ of the throttle valve 4. Also this desired valve opening value $\theta_{THO}$ is used in determining the sign of the difference $(\theta_{THO}-\theta_{THP})$ between the same value and the pulse counter value $\theta_{THP}$ at the step S5 in FIG. 2 as well as in determining the throttle valve opening command value $\theta_{CMD}$ at the step S7 in FIG. 2.

In this manner, even in the case where excessive slip of the driving wheels has been eliminated before determination of the initial position of the pulse motor, the present loop of steps S131, S132, S137, and S140 is repeatedly executed to gradually increase the desired valve opening value $\theta_{THO}$. Consequently, just like the case where such excessive slip has been eliminated after determination of the above initial position, the pulse motor 7 is driven toward the fully open position of the throttle valve 4 by the execution of steps S5, S6, and S7, and steps S15, S16, S17, and S18 (open loop control) in FIG. 2 in the mentioned order. And at a step S141 following the step S140, just like the step S135 described above, it is determined whether or not the thus increased desired valve opening value $\theta_{THO}$ is larger than the maximum opening position value $\theta_{THPO}$. If the former is not larger than the latter, the program is immediately terminated, whereas if the former is larger that the latter, the flag $F_{ATC}$ is set to 0, and the maximum opening position value $\theta_{THPO}$ is set to the pulse counter value $\theta_{THP}$ at the step S136, followed by termination of the program.

As described above, according to the invention, in the case where the actual TCS operating time is so short that excessive slip of the driving wheels is eliminated to terminate the TCS control before determination of the pulse motor initial position, the desired opening value $\theta_{THO}$ of the throttle valve is gradually increased like the case where excessive slip of the driving wheels is eliminated after determination of the pulse motor initial position, and based upon the thus increased desired value $\theta_{THO}$ the pulse motor is controlled to drive the throttle valve into the fully open position by open loop control. As a result, it is possible to drive the pulse motor to positively bring the throttle valve into its fully open position. Therefore, the disadvantage as inherent in the feedback control can be overcome that in driving the pulse motor to bring the throttle valve into the fully open position, it cannot be determined whether or not the pulse motor has actually been driven to a position corresponding to the fully open position of the throttle valve so that the supply of the driving signal to the pulse motor is continued.

What is claimed is:

1. In a control system for controlling driving wheels of an automotive vehicle provided with an internal combustion engine having a throttle system including a throttle valve, and an accelerator pedal, the system including engine output-reducing means having a pulse motor disposed to drive the throttle valve, and throttle valve control means responsive to a slip state of at least one of said driving wheels for causing said pulse motor to drive said throttle valve in a direction of closing same or in a direction of opening same, wherein said engine output-reducing means is operable upon detection of excessive slip of at least one of said driving wheels to drive said throttle valve in said direction of closing same for reducing output of said engine to thereby suppress said excessive slip, the improvement comprising:

first detecting means for detecting opening of said throttle valve;

second detecting means for detecting an angle of said accelerator pedal; and initial position-determining means for determining an initial position of said pulse motor, said initial position-determining means being operable to store a value of said opening of said throttle valve detected by said first detecting means as a reference value of a position of said pulse motor when a state that said detected value of said opening of said throttle valve is smaller than a value of said angle of said accelerator pedal detected by said second detecting means while said pulse motor is in stoppage has continued over a predetermined period of time.

2. A control system as claimed in claim 1, including:

feedback control means for controlling said position of said pulse motor with reference to values of said opening of said throttle valve detected by said first detecting means before said storing of said reference value of said position of said pulse motor by said initial position-determining means; and open loop control means for controlling said position of said pulse motor with reference to said reference value stored by said initial position-determining means after said storing of said reference value by said initial position-determining means.

3. A control system as claimed in claim 1, including:

means for calculating a desired value of said opening of said throttle valve;

means for comparing said desired value of said opening of said throttle valve with said reference value of said position of said pulse motor;

and means for causing said initial position-determining means to again store a value of said opening of said throttle valve detected by said first detecting means as said reference value of said position of said pulse motor when said desired value of said opening of said throttle valve is smaller than said reference value.

4. A control system as claimed in 1, including abnormality-determining means for determining that said throttle system is abnormal if said initial position of said pulse motor has not yet been determined when a second predetermined period of time has elapsed after said pulse motor started to drive said throttle valve toward a fully closed position thereof.

5. A control system as claimed in claim 4, including forced driving means for forcedly driving said pulse motor to bring said throttle valve into a fully open position thereof when said throttle valve is determined to be abnormal.

6. A control system as claim 4, wherein said engine output-reducing means further includes at least one of fuel injection quantity-reducing means and ignition timing-retarding means, said engine output-reducing means disabling said throttle valve control means and actuating at least one of said fuel injection quantity-reducing means and said ignition timing-retarding means when said throttle valve is determined to be abnormal.

7. A control system as claimed in claim 1, including throttle valve-driving means for disabling said engine output-reducing means and driving said pulse motor to bring said throttle valve into a fully open position thereof by open loop control irrespective of whether or not said initial position of said pulse motor has been determined, when said excessive slip of at least one of said driving wheels has been suppressed.

* * * * *